Figure 1:
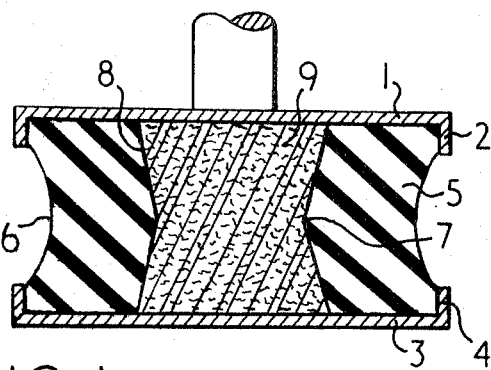

United States Patent

[11] 3,610,610

[72] Inventor Pierre Chassagne
 c/o Fort Dunlap Erdington, Birmingham 24, England
[21] Appl. No. 794,063
[22] Filed Jan. 27, 1969
[45] Patented Oct. 5, 1971
[32] Priority Jan. 31, 1968
[33] France
[31] 22,132

[54] APPARATUS FOR ABSORBING SHOCKS AND VIBRATIONS
 3 Claims, 2 Drawing Figs.
[52] U.S. Cl. ............................................... 267/152
[51] Int. Cl. ............................................... F16f 1/37
[50] Field of Search ............................................... 267/140, 141, 152, 153

[56] References Cited
UNITED STATES PATENTS
3,134,585 5/1964 Trask ........................... 267/153
FOREIGN PATENTS
890,942 3/1962 Great Britain ................ 267/153

Primary Examiner—James B. Marbert
Attorney—William A. Drucker

ABSTRACT: An antivibration mounting comprising an annular element of resilient polymeric material confined between rigid end pieces at its axially outer ends and containing in its central space an inner element of polymeric foam material, the annular element having a radially inwardly arched configuration.

PATENTED OCT 5 1971　　　　　　　　3,610,610

INVENTOR
PIERRE CHASSAGNE
By Stevens, Davis, Miller & Mosher
ATTORNEYS

APPARATUS FOR ABSORBING SHOCKS AND VIBRATIONS

This invention relates to apparatus for absorbing shocks and vibrations, of the kind used, for example, as an antivibration machine mounting.

One object of the invention is to provide an improved antivibration mounting having an omnidirectional shock-absorbing action.

According to the invention, apparatus for absorbing shocks and vibrations comprises an annular element of resilient polymeric material confined between rigid end pieces at its axially outer ends, the annular element containing in its central space an inner element of polymeric foam material and the annular element being shaped so as to provide a radially inwardly arched configuration, considered in axial cross section, such that axial compression of the annular element causes the central portion thereof to be urged radially inwardly to compress the foam material.

An antivibration mounting in accordance with the invention may take the form of a pair of disc-shaped metallic end pieces each having a circumferential axially extending lip serving to trap the corresponding end of an annular element in the form of a hollow cylindrical rubber spring having an external profile which curves radially inwardly from the end portions towards the central portion thereof and an internal profile which projects radially inwardly in the central region thereof, the central space within the annular element being filled with an expanded cellular material such as a closed-cell polymeric foam material.

It is a feature of the shock absorbing apparatus described above that an applied shock load causes the inner element or packing to be compressed in two mutually perpendicular directions.

Figure 2:
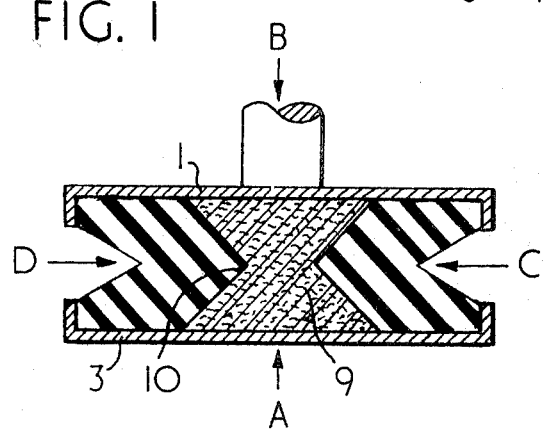

One embodiment of the invention will now be described, by way of example, with reference to the accompanying drawings, in which:

FIG. 1 is an axial cross-sectional view of an antivibration and shock-absorbing mounting in the unloaded state, and FIG. 2 is a similar view showing the mounting in the loaded state.

The mounting shown in FIG. 1 comprises a pair of disc-shaped rigid metal end pieces 1 and 3 having, respectively, circumferential axially extending lips 2 and 4 which serve to trap a hollow cylindrical rubber spring 5 between the end pieces 1 and 2.

The external surface 6 of the spring 5 is slightly concave, and the internal surface projects radially inwardly relative to the axis of the spring 5 to form a neck portion 7 at the line of intersection of two frustoconical surfaces. The spring thus has a radially inwardly arched configuration.

The central space 8 within the rubber spring 5 is packed with an element 9 formed from a closed-cell synthetic polymeric material.

When the spring 5 is compressed axially by an applied load as indicated by the arrows A, B in FIG. 2, the arched configuration of the spring is caused to project further inwardly as indicated at 10 in FIG. 2. This compresses the packing 9, which acts as a shock absorbing or damping material and also serves to modify the spring characteristics of the spring 5. It will be noted that the compression of the packing 9 takes place in two mutually perpendicular directions: first as a result of the relative axial movement of the plates 1 and 3 and then as a result of the inward movement of the walls of the spring 5, as indicated by the arrows C and D.

Both the elements 5 and 9 are elastic, and thus after being subjected to a mechanical action which reduces their volume or changes their shape they tend to return to their initial state as soon as the applied force is removed.

In addition to the capacity to absorb shock loading, the mounting described above is able to absorb, omnidirectionally, sound and other vibrations.

The mounting described above can be used on any vibrating apparatus or apparatus to be isolated from vibrations, for domestic, industrial, or other applications. The forms dimensions and arrangement of the component elements and their material may be varied according to specific circumstances and equivalent means may be employed without thereby changing the general concept of the invention.

Having now described my invention What I claim is:

1. An article of manufacture, in the form of shock absorber antivibration mounting apparatus, comprising in combination: an annular hollow cylindrical resilient polymeric body element surrounding a concentric core element of elastic expanded cellular polymeric foam, both said elements being secured and restrained between rigid members at either end of a common axis, the outer radial edge of the annular member being symmetrically concave and the inner edge of the annular member being symmetrically convex toward the axis, the radial edge of the core member being symmetrically concave and nesting within the inner convex edge of the annular member, such that upon axial compression of both members the inner edge of the annular member is urged radially against the edge of the core to compress the core radially as well as axially.

2. Article according to claim 1, wherein the rigid end pieces are of disc-shaped metallic form each having a circumferential axially extending lip to trap the corresponding end of the annular element.

3. Article according to claim 1, wherein the inner element is of closed-cell polymeric foam material.